Patented June 28, 1927.

1,634,079

UNITED STATES PATENT OFFICE.

TSUNEGORO NISHI, OF TOKYO-FU, JAPAN.

PROCESS OF MANUFACTURING WALL BOARDS COMPOSED OF RICE HULLS AND PLASTER.

No Drawing. Application filed September 4, 1925, Serial No. 54,548, and in Japan November 20, 1924.

This invention relates to a process of manufacturing wall-boards composed of rice-hulls and plaster, and has for its object to provide for light and inexpensive wall-boards which have such desirable properties as airiness, sound-arresting, heat-protecting, &c.

The process in accordance with the present invention is characterized by the fact that, after smashing every rice-hull into several slender pieces, the rice-hulls are mixed with plaster, plaster and lime, or plaster and cement, then the mixture being then pressed in a mould and dipped into water, and thereafter it is removed from the water, thus allowing it to dry.

The invention will be readily understood from the following detailed description.

The rice-hull is covered with silicious surface having numerous small projections thereon, and is light, stiff, less combustible, less corruptible, non-heat-conducting and nearly unaffected under dryness and wetness.

It is already known that the wall-board composed of such rice-hulls and plaster, which latter is a good binding material, has many desirable properties such as airiness, sound-arresting, heat-protecting, &c.

Heretofore, according to the known process of manufacturing such wall-boards, the rice-hulls in the ordinary state have been mixed with plaster and water, and then the mixture has been pressed under pressure to be formed. But in this process there is a great drawback which is to limit the quantity of rice-hulls in the product to a small extent owing to the difficulty in setting, said product lacking considerably in the above mentioned desirable properties.

By the process in accordance with the present invention such drawback is entirely removed and a more desirable product can be obtained.

In the first operation of said process every rice-hull is smashed into several slender pieces, this operation being very important. The rice-hull is of hollow, capsule form and when in their original state cannot be combined with plaster or other materials in sufficient quantities to produce the desired result. On the other hand, by breaking up the hulls into small pieces a large quantity of the hulls may be employed with the plastic material used.

After this operation said smashed rice-hulls are rid of impurities.

In the next operation the smashed rice-hulls are mixed with plaster, plaster and lime, or plaster and cement in a suitable proportion, without adding water, which proportion in weight is given by way of example as follows:

(1) Rice-hulls, 4; and plaster, 9; (2) rice-hulls, 2; plaster, 4; and lime, 1; (3) rice-hulls, 8; plaster, 12; and cement, 15, where lime or cement is used in order to increase the strength of the product.

The mixture is brought into a mould, which may be of any desired shape, and pressed under suitable pressure. Then the pressed mixture in the mould being dipped into water and after five to twenty minutes it is withdrawn from water and left to dry and become set.

Thus the required wall-board is produced.

If the product is coated with a solution of silicate of soda or ammonia borate, waterproof wall-board will be obtained. And moreover, if iron reinforcement is placed within the mixture during the operation of filling it in a mould, a very strong product will be obtained and it may be used as floor slab.

It is of course to be understood that the present invention described above may be modified in various manners without departing from the scope of the invention.

Having thus fully described my invention, I claim as new and desire to secure by Letters Patent:—

1. The process of manufacturing wall-boards composed of rice hulls and plaster in which, after crushing the rice hulls into slender pieces, the same are mixed with plaster, the mixture then being pressed in a mould and thereafter dipped in water.

2. The process of manufacturing wall-boards composed of rice hulls and plaster in which, after crushing the rice hulls into slender pieces, the same are mixed with plaster and lime, the mixture then being pressed in a mould and thereafter dipped in water.

3. The process of manufacturing wallboards composed of rice hulls and plaster in which, after crushing the rice hulls into slender pieces, the same are mixed with plaster and cement, the mixture then being pressed in a mould and thereafter dipped in water.

In testimony whereof I have affixed my signature.

TSUNEGORO NISHI.